US012325051B2

(12) United States Patent
Ji

(10) Patent No.: US 12,325,051 B2
(45) Date of Patent: Jun. 10, 2025

(54) CLEANER FOR AN IONIZER, OPERATING METHOD THEREOF AND IONIZER CLEANING SYSTEM

(71) Applicant: SK hynix Inc., Gyeonggi-do (KR)

(72) Inventor: Moon Young Ji, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 668 days.

(21) Appl. No.: 17/565,196

(22) Filed: Dec. 29, 2021

(65) Prior Publication Data

US 2022/0258209 A1 Aug. 18, 2022

(30) Foreign Application Priority Data

Feb. 16, 2021 (KR) ........................ 10-2021-0020422
Sep. 24, 2021 (KR) ........................ 10-2021-0126519

(51) Int. Cl.
*B08B 1/12* (2024.01)
*B03C 3/74* (2006.01)
*B08B 5/04* (2006.01)
*B08B 15/00* (2006.01)

(52) U.S. Cl.
CPC .................. *B08B 1/12* (2024.01); *B08B 5/04* (2013.01); *B08B 15/007* (2013.01); *B03C 3/743* (2013.01); *B03C 2201/04* (2013.01)

(58) Field of Classification Search
CPC .. B08B 1/12; B08B 1/30; B08B 11/02; B08B 2215/006; B08B 17/04; B03C 2201/04; B03C 3/743; B03C 3/746; G06K 19/0716
USPC ......................... 96/25, 31; 399/100; 361/230
See application file for complete search history.

(56) References Cited

U.S. PATENT DOCUMENTS 4,318,718 A * 3/1982 Utsumi ................... B03C 3/743 96/51
4,734,580 A * 3/1988 Rodrigo .................. H01T 21/00 361/230
4,885,466 A * 12/1989 Koichi ............... G03G 15/0291 347/120

(Continued)

FOREIGN PATENT DOCUMENTS

DE 2830843 A * 2/1979 ............... B03C 3/10
KR 10-1999-0003268 A 1/1999

(Continued)

*Primary Examiner* — Jennifer Dieterle
*Assistant Examiner* — Sonji Turner
(74) *Attorney, Agent, or Firm* — IP & T GROUP LLP

(57) ABSTRACT

A cleaner for an ionizer may include a communication interface, a cleaning member, a driver and a controller. The communication interface may be configured to communicate information with the ionizer. The cleaning member may be moved along a wire of the ionizer to remove and collect particles. The driver may be configured to drive the cleaning member. Further, the driver may recognize a starting of the cleaning member from a beginning spot of the wire, an arriving of the cleaning member at an ending spot of the wire, or a returning of the cleaning member to the beginning spot of the wire. The controller may control whole operations of the cleaner. The whole operations of the cleaner may include identifying states including the driving of the ionizer through the communication interface, removing the particles on the wire by driving the cleaning member through the driver, etc.

11 Claims, 16 Drawing Sheets

(56) References Cited

U.S. PATENT DOCUMENTS

| | | | | | |
|---|---|---|---|---|---|
| 5,012,093 | A * | 4/1991 | Shimizu | G03G 15/0258 | 361/230 |
| 5,392,099 | A * | 2/1995 | Kusumoto | G03G 15/5062 | 250/325 |
| 5,429,669 | A * | 7/1995 | Chang | B03C 3/47 | 95/76 |
| 5,485,255 | A * | 1/1996 | Reuschle | G03G 15/0258 | 399/168 |
| 6,449,447 | B1 * | 9/2002 | Regelsberger | G03G 15/0258 | 361/230 |
| 6,580,885 | B2 * | 6/2003 | Walgrove, III | G03G 15/0291 | 250/324 |
| 6,855,190 | B1 * | 2/2005 | Nikkhah | B03C 3/32 | 96/96 |
| 7,220,295 | B2 * | 5/2007 | Lau | B03C 3/016 | 96/96 |
| 7,716,772 | B2 * | 5/2010 | Shih | B08B 1/32 | 15/97.1 |
| 8,718,508 | B2 * | 5/2014 | Takiguchi | G03G 15/161 | 399/170 |
| 2005/0063727 | A1 * | 3/2005 | Quinones | G03G 15/0291 | 399/100 |
| 2005/0199125 | A1 * | 9/2005 | Taylor | B01J 19/08 | 422/186.04 |
| 2005/0210902 | A1 * | 9/2005 | Parker | F24F 8/192 | 62/230 |
| 2007/0065172 | A1 * | 3/2007 | Sekovski | G03G 15/0291 | 399/100 |
| 2008/0069586 | A1 * | 3/2008 | Dangelmaier | G03G 15/0258 | 399/100 |
| 2008/0317494 | A1 * | 12/2008 | Budding | G03G 15/0258 | 399/170 |
| 2009/0274592 | A1 * | 11/2009 | Bergeron | H01J 37/32568 | 422/186.04 |
| 2011/0265832 | A1 * | 11/2011 | Honer | B03C 3/41 | 134/32 |
| 2011/0308773 | A1 * | 12/2011 | Gao | B03C 3/743 | 451/103 |
| 2019/0353359 | A1 * | 11/2019 | Seibold | F24F 1/0076 | |
| 2020/0113036 | A1 * | 4/2020 | Gorczyca | F24F 11/52 | |

FOREIGN PATENT DOCUMENTS

| | | | | |
|---|---|---|---|---|
| KR | 10-2001-0060702 | A | 7/2001 | |
| KR | 20-0300177 | Y1 | 1/2003 | |
| KR | 10-2009202 | B1 | 8/2019 | |
| KR | 20220117110 | A * | 8/2022 | B08B 11/00 |

* cited by examiner

CLEANER FOR AN IONIZER, OPERATING METHOD THEREOF AND IONIZER CLEANING SYSTEM

CROSS-REFERENCES TO RELATED APPLICATION

The present application claims priority under 35 U.S.C. § 119(a) to Korean Patent application number 10-2021-0020422, filed on Feb. 16, 2021, and Korean Patent application number 10-2021-0126519, filed on Sep. 24, 2021, in the Korean Intellectual Property Office, which are incorporated herein by reference in their entirety.

BACKGROUND

1. Technical Field

Various embodiments may generally relate to a cleaner for an ionizer, an operating method thereof, and an ionizer cleaning system. More particularly, various embodiments may relate to a cleaner for an ionizer that may be capable of performing an automatic cleaning operation with improved cleaning efficiency to maintain the ionizer with an optimal state, an operating method thereof and an ionizer cleaning system.

2. Related Art

Recently, an electrostatic generated in various equipment such as semiconductor equipment may cause deterioration, fires, etc., of the equipment due to a foreign substance such as for example a charged dust particle. Thus, various ionizers may be applied to the various equipment.

The ionizer may apply cations or anions, which may be generated by discharging a high voltage, to an object to neutralize the object having a polarity opposite a polarity of the electrostatic, thereby removing the electrostatic.

In order to maintain a capacity of the ionizer, it may be required to cleanly maintain the ionizer.

The ionizer may be classified into a bar type, a nozzle type and a wire type in accordance with formation structures of a region where ions may be generated.

The wire type ionizer may be manually cleaned using a cleaner by a worker. The wire may be cut in cleaning the wire type ionizer.

Further, additional time and endeavor of the worker may be required to manage the ionizer. Moreover, when the ionizer is cleaned while operating the ionizer, the quality of the object may deteriorate.

SUMMARY

Embodiments of the invention provide a cleaner for a wire type ionizer that may have improved cleaning efficiency.

Embodiments of the invention also provide a method of operating the above-mentioned cleaner.

Embodiments of the invention still also provide an ionizer cleaning system.

In one embodiment, a cleaner for an ionizer may include a communication interface, a cleaning member, a driver and a controller. The communication interface may be configured to communicate information with the ionizer. The cleaning member may be moved along a wire of the ionizer to remove and collect particles. The driver may be configured to drive the cleaning member. Further, the driver may recognize a starting of the cleaning member from a beginning spot of the wire, an arriving of the cleaning member at an ending spot of the wire, or a returning of the cleaning member to the beginning spot of the wire. The controller may control whole operations of the cleaner. The whole operations of the cleaner may include identifying states including the driving of the ionizer through the communication interface, removing the particles on the wire by driving the cleaning member through the driver, etc.

In one embodiment, an ionizer cleaning system may include a wire type ionizer and a cleaner. The ionizer may generate cation or anion to an object. The cleaner may be moved along the wire of the ionizer to remove particles. The cleaner may include a communication interface, a cleaning member, a driver and a controller. The communication interface may be configured to communicate information with the ionizer. The cleaning member may be moved along a wire of the ionizer to remove and collect particles. The driver may be configured to drive the cleaning member. Further, the driver may recognize a starting of the cleaning member from a beginning spot of the wire, an arriving of the cleaning member at an ending spot of the wire, or a returning of the cleaning member to the beginning spot of the wire. The controller may control whole operations of the cleaner. The whole operations of the cleaner may include identifying states including the driving of the ionizer through the communication interface, removing the particles on the wire by driving the cleaning member through the driver, etc.

In one embodiment, according to a method of operating a cleaner for an ionizer, when a clean beginning signal may be generated, whether a driving of the ionizer may be stopped or not may be identified. When the driving of the ionizer may be stopped, a cleaning member may be driven. The cleaning member may be moved from a beginning spot of the wire to the beginning spot of the wire via an ending spot of the wire to remove particles from the wire. The cleaning of the cleaning member may be terminated. A drive request signal may then be transmitted to the ionizer. Cleaning data obtained in cleaning the ionizer may be collected and analyzed.

In one embodiment, an ionizer cleaning system may include a plurality of ionizers, a plurality of cleaners and a clean management server. Identification information (ID) may be allotted to the ionizers, respectively. The cleaners may be detachably installed at the ionizers, respectively. Identification information (ID) may be allotted to the cleaners. The clean management server may control the ionizers and the cleaners. The clean management server may identify states including the driving of the ionizer. The clean management server may drive the cleaner based on the states of the ionizer to remove particles on a wire of each of the ionizers.

According to various embodiments, the wire type ionizer may be automatically cleaned by the cleaner, not manually cleaned using a cleaner by a worker to improve cleaning efficiency of the ionizer.

Further, a cleaning history of the ionizer may be stored and managed. The cleaning of the ionizer may be controlled and a cleaning cartridge may be exchanged for a new one based on the cleaning history to maintain the ionizer having optimal state.

Furthermore, the cleaner may remove the foreign substance on the wire along a predetermined rail to prevent the wire from being damaged.

Moreover, the cleaning may be performed after operation stages of the ionizer to prevent damages of the ionizer due to the cleaning.

Further, the cover frame may be configured to safely protect the ionizer and the cleaner, to prevent the inflow of foreign particles from outside and to effectively remove residual(s) around the wire thereby preventing the wire from being damaged.

BRIEF DESCRIPTION OF THE DRAWINGS

The above and another aspects, features and advantages of the subject matter of the present disclosure will be more clearly understood from the following detailed description taken in conjunction with the accompanying drawings, in which.

DETAILED DESCRIPTION

Various embodiments of the present invention will be described in greater detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims.

The present invention is described herein with reference to cross-section and/or plan illustrations of idealized embodiments of the present invention. However, embodiments of the present invention should not be construed as limiting the inventive concept. Although a few embodiments of the present invention will be shown and described, it will be appreciated by those of ordinary skill in the art that changes may be made in these embodiments without departing from the principles and spirit of the present invention.

Figure 1:
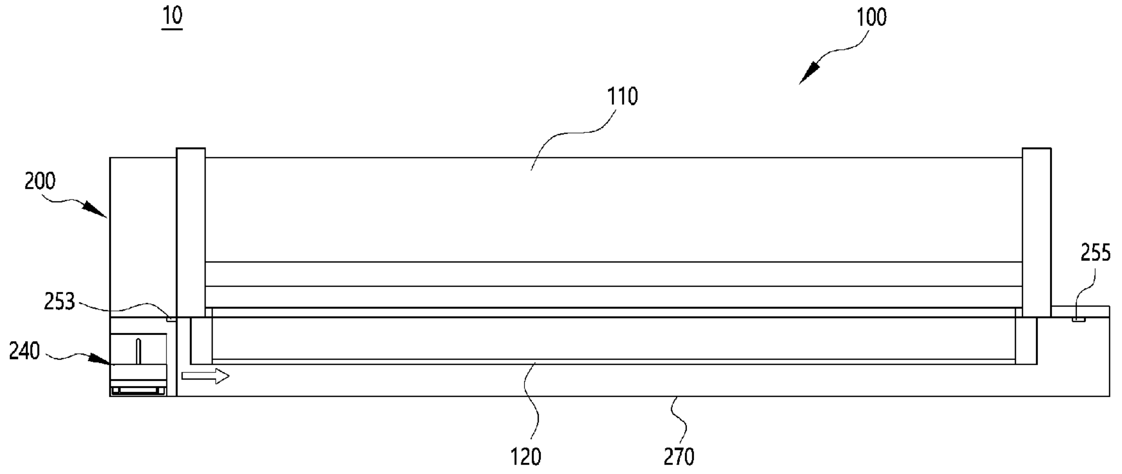
FIG. 1 is a view illustrating an ionizer cleaning system in accordance with example embodiments.
Figure 2:
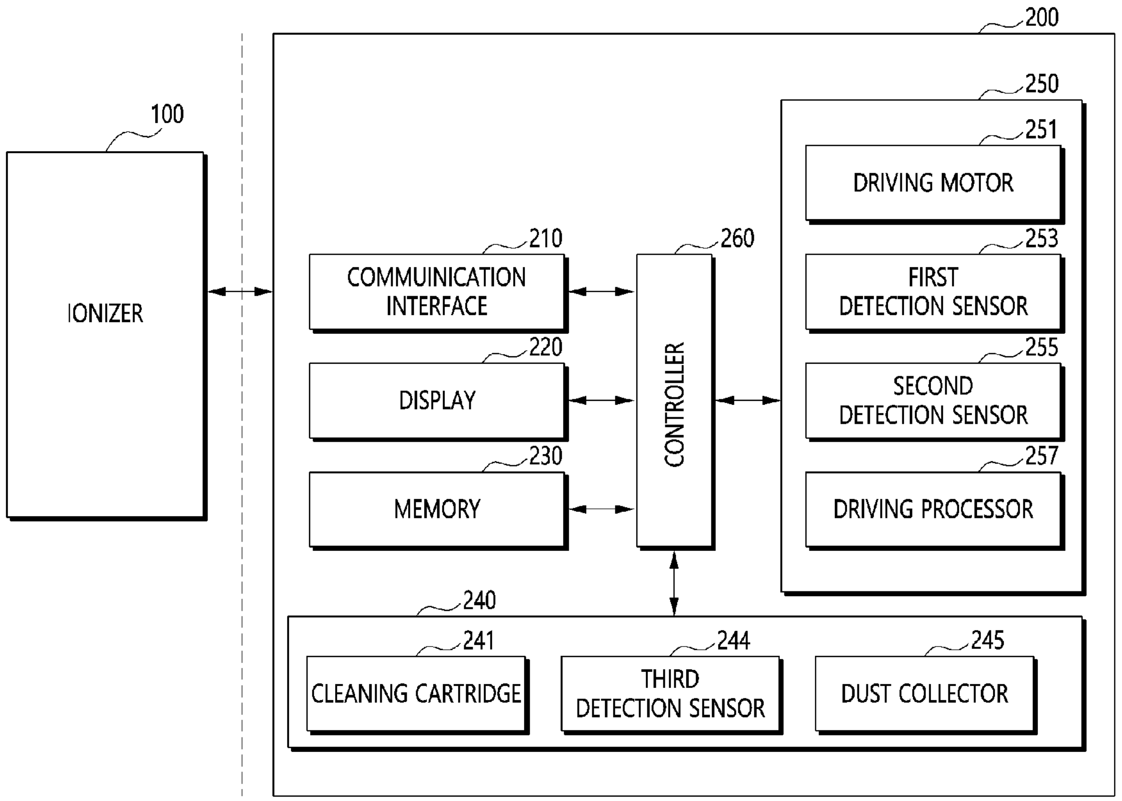
FIG. 2 is a block diagram illustrating a cleaner in accordance with example embodiments.

FIG. 1 is a view illustrating an ionizer cleaning system in accordance with example embodiments, and FIG. 2 is a block diagram illustrating a cleaner in accordance with example embodiments.

Referring to FIG. 1, an ionizer cleaning system 10 may include an ionizer 100 and a cleaner 200.

The ionizer 100 may have a wire type structure configured to generate cations or anions to direct toward an object and which may neutralize the object.

The cleaner 200 may move along a wire 120 of the ionizer 100 to remove a foreign substance (particles) such as for example particles from the ionizer 100.

The cleaner 200 may be disposed at a body 110 of the ionizer 100. The cleaner 200 may move backward and forward along the wire 120 disposed under the body 110 and spaced apart from the body 110.

Ions may be generated from the wire 120 of the ionizer 100. When a foreign substance may be adhered to the wire 120 or a white powder may be generated at the wire 120, a corona discharge for generating the ions may not be desirably generated. Thus, the wire 120 in one embodiment would be maintained as a clean state to generate the desirable corona discharge.

The cleaner 200 may automatically clean the wire 120 with a minimum influence on a driving of the ionizer 100 so that the wire 120 may be maintained as an optimal state.

Referring to FIG. 2, the cleaner 200 may include a communication interface 210, a display 220, a memory 230, a cleaning member 240, a driver 250 and a controller 260.

The communication interface 210 may be interfaced with the ionizer 100 to transmit and receive information to and from the ionizer 100.

The display 220 may display all information with respect to operations of the cleaner 200. The information may include a history of cleaning, automatic clean information, a replacement time of a cleaning cartridge, a replacement history of the cleaning cartridge, a number of times that the cleaning member 240 cleans the wire 120, etc.

The cleaning history may include at least one of a time of a cleaning operation of the cleaner 200, an automatic or manual operation of the cleaning operation, a time of the cleaning operation, data of the cleaning operation, a total number of times that the cleaning operation is performed, a number of times that the cleaning operation is performed after replacement of the cleaning cartridge, etc., based on drive information of the cleaning member 240. When automatic cleaning conditions including an automatic cleaning time, an automatic cleaning period, etc., may meet, the cleaner 200 may automatically perform the cleaning operation in the automatic mode. Further, the cleaner 200 may automatically perform the cleaning operation in the manual mode by inputting a command of the cleaning operation by a user.

When an alarm is made for the replacement time of the cleaning cartridge, the alarm may include additionally displaying a number of times that the cleaning cartridge operates as well as the replacement time of the cleaning cartridge.

The memory 230 may store information with respect to the cleaner 200.

The cleaning member 240 may move along the wire 120 of the ionizer 100 to remove and collect the foreign substance.

When the cleaning member 240 may be on a standby state not to perform the cleaning operation, the cleaning member 240 may be placed in a region where the cleaning member 240 may not interrupt the ion generation of the ionizer 100. For example, the region may be positioned outside the wire 120.

The cleaning member 240 may include a cleaning cartridge 241, a third detection sensor 244 and a dust collector 245.

FIGS. 3 to 6 are views illustrating operations of a cleaner in accordance with example embodiments.

Referring to FIGS. 1, 3, 4 and 5, the cleaner 200 may further include a driving rail 270 detachably disposed at one end of the ionizer 100. The driving rail 270 may be substantially in parallel with the wire 120 of the ionizer 100. The driving rail 270 may function such that a cleaning brush 241-2 of the cleaning member 240 is in contact with the wire 120 while the cleaning member 240 is operating.

Figure 3:
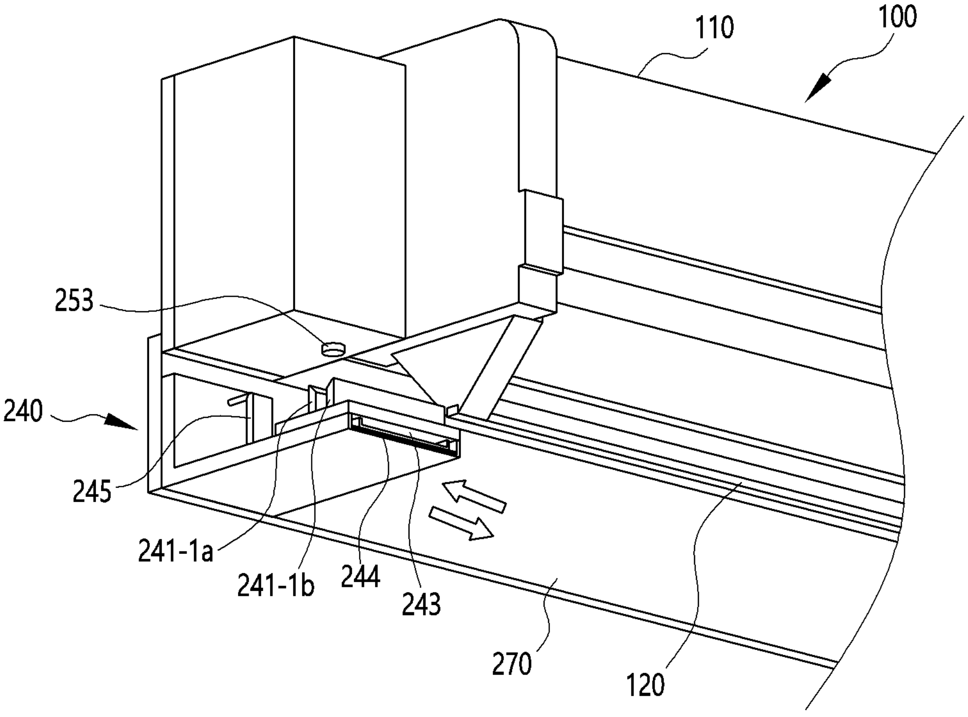
FIGS. 3 to 6 are views illustrating operations of a cleaner in accordance with example embodiments.
Figure 4:
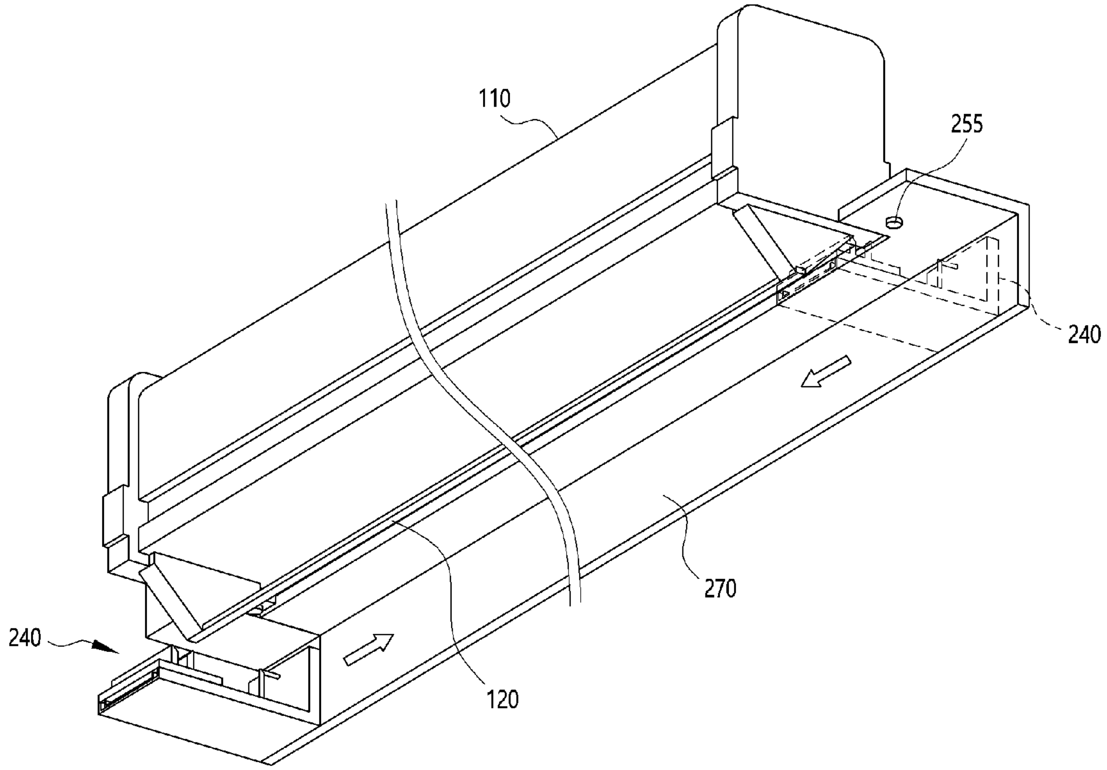
Figure 5:
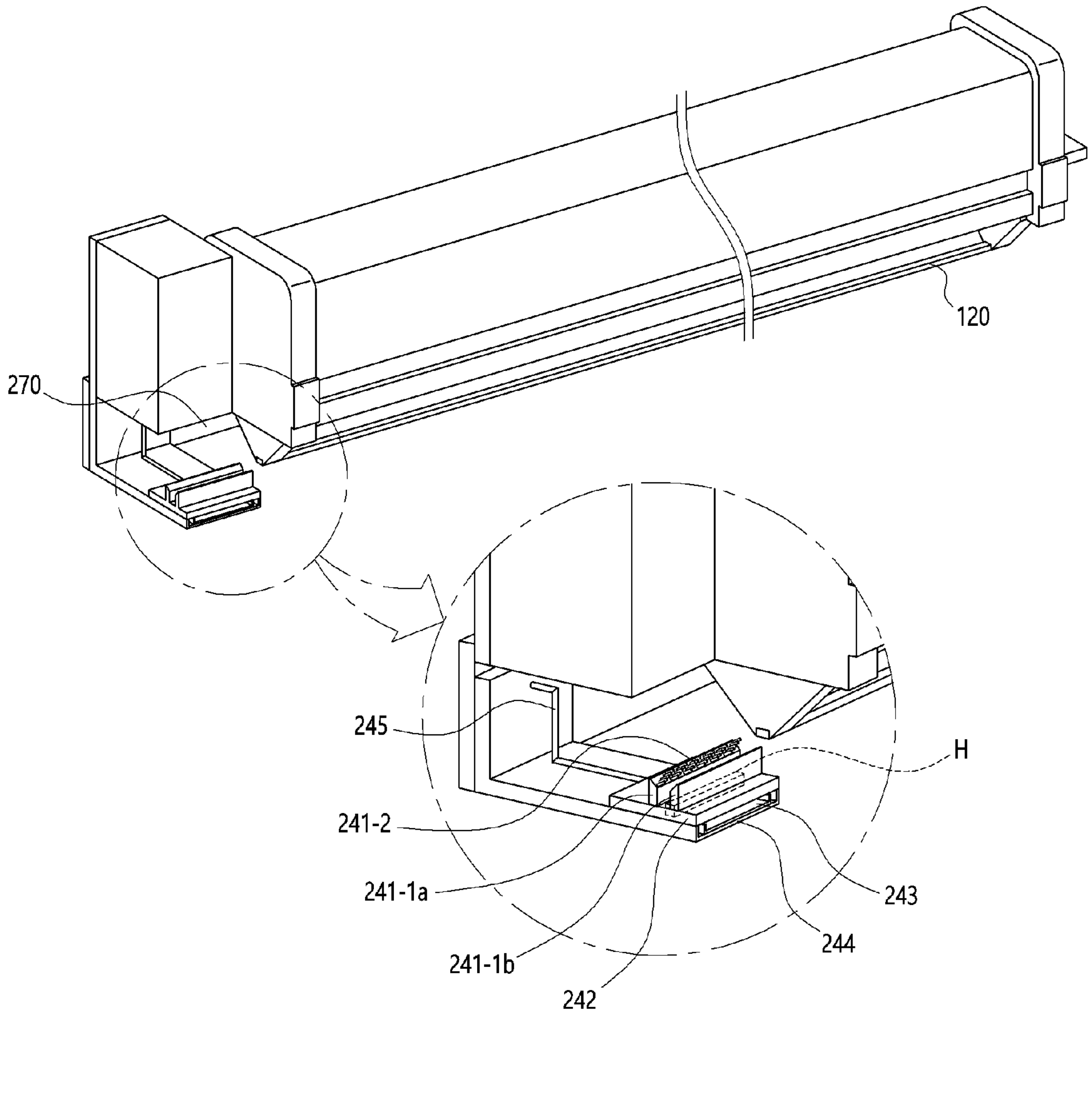

Referring to FIGS. 3 to 5, the cleaning member 240 may be connected to the driving rail 270 at one end of the ionizer 100. During the cleaning member 240 may move along the driving rail 270, the wire 120 may be inserted into a space between a first body **241-1*a* and a second body 241-1*b***.

Figure 6:
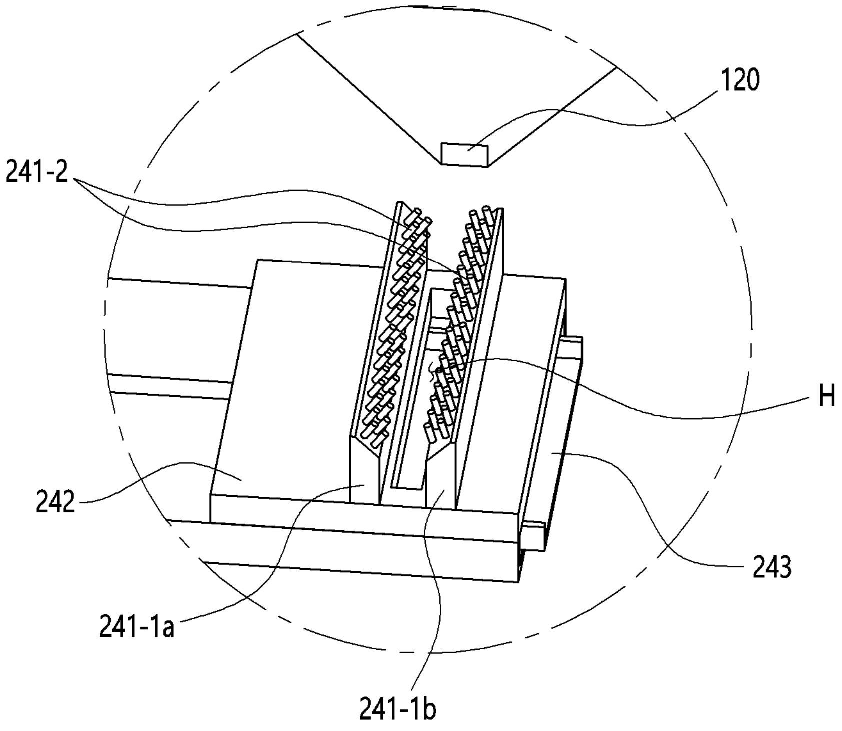

Referring to FIGS. 5 and 6, the cleaning cartridge 241 may include the first and second bodies **241-1*a* and 241-1*b* and the cleaning brush 241-2. The first body 241-1*a* may be formed at one side of the wire 120 during the cleaning member 240 may move along the wire 120. The second body 241-1*b* may be formed at the other side of the wire 120 during the cleaning member 240 may move along the wire 120. Thus, the first and second bodies 241-1*a* and 241-1*b* may face each other to cover the wire 120 for example in a perpendicular direction to a longitudinal direction of the wire 120 and may be spaced apart from each other. The cleaning brush 241-2 may be formed on an inner surface of each of the first and second bodies 241-1*a* and 241-1*b* to remove the foreign substance on the wire 120**.

The cleaning cartridge 241 may be detachably connected to a pedestal 242. Thus, the cleaning cartridge 241 may be replaced with a new one in accordance with the replacement time by a use degree of the cleaning cartridge 241, or arbitrarily replaced with a new one.

Additionally, the cleaning member 240 may further include the pedestal 242 and a collecting container 243 connected to the cleaning cartridge 241.

The pedestal 242 may be arranged under the first and second bodies **241-1*a* and 241-1*b*. The pedestal 242 may include a collecting hole H formed at a region between the first and second bodies 241-1*a* and 241-1*b***.

The collecting container 243 may be arranged under the pedestal 242 to collect the foreign substance through the collecting hole H.

The collecting container 243 may be detachably connected to a lower portion of the pedestal 242. Thus, the worker may detach the collecting container 242 from the pedestal 242 to manually remove the foreign substance.

The third detection sensor 244 may be configured to detect a weight of the foreign substance collected in the collecting container 243.

Referring to FIGS. 5 and 6, the third detection sensor 244 may be positioned under the collecting container 243 to detect the weight of the foreign substance collected in the collecting container 243. The position of the third detection sensor 244 may be changed into other positions at which the weight of the foreign substance collected in the collecting container 243 may be detected.

Referring to FIG. 5, the cleaning member 240 may further include the dust collector 245. The dust collector 245 may be connected to the collecting container 243. The dust collector 245 may inhale the foreign substance collected in the collecting container 243. The dust collector 245 may then discharge the inhaled foreign substance to an outside of the ionizer 100. Thus, the foreign substance may be moved through a duct between the collecting container 243 and the dust collector 245.

The dust collector 245 may perform a dust collecting operation including inhaling the foreign substance and discharging the foreign substance. When the cleaning member 240 is returned to a beginning spot of the wire 120, the cleaning member 240 may operate to detect the foreign substance in the collecting container 243, or determine that the weight of the foreign substance collected in the collecting container 243 is no less than a predetermined reference weight.

Referring to FIG. 5, the cleaning member 240 may move along the wire 120 during the cleaning operation. In various embodiments, the cleaning cartridge 241, the pedestal 242, the collecting container 243, the third detection sensor 244 and the dust collector 245 may move along the wire 120.

The driver 250 may be configured to drive the cleaning member 240. The driver 250 may detect that the cleaning member 240 starts moving from a beginning spot of the wire 120, reaches an ending spot of the wire 120 or returns to the beginning spot of the wire 120.

Referring to FIG. 2, the driver 250 may include a first driving motor 251, a first detection sensor 253, a second detection sensor 255 and a driving processor 257.

The driving motor 251 may be configured to drive the cleaning member 240.

The first detection sensor 253 may be positioned at the beginning spot of the wire 120 to detect that the cleaning member 240 starts moving from and returns to the beginning spot of the wire 120.

The second detection sensor 255 may be positioned at the ending spot of the wire 120 to detect that the cleaning member 240 reaches the ending spot of the wire 120.

At least one of first and second detection sensors 253 and 255 may be a position sensor including at least one of a contact type sensor and a non-contact type sensor.

In one embodiment, the first detection sensor 253 may be positioned at the beginning spot of the wire 120 and may be positioned outside a path of the wire 120 more than the cleaning member 240 to detect that the cleaning member 240 starts moving from and returns to the beginning spot according to approach and recession of the cleaning member 240. This principle may also be applied to the second detection sensor 255.

Alternatively, the first detection sensor 253 may be positioned at the beginning spot of the wire 120 and may be positioned inside the path of the wire 120 more than the cleaning member 240 to detect that the cleaning member 240 starts moving from and returns to the beginning point by sensing the cleaning member 240 passing thereby. This principle may also be applied to the second detection sensor 255.

The driving processor 257 may be configured to drive and stop the driving motor 251 in accordance with the controls of the controller 260. The driving processor 257 may transmit the driving information of the cleaning member 240 including the cleaning time, a return time, etc., obtained based on the detection information provided from the first and second detection sensors 253 and 255.

The driving processor 257 may transmit the driving information of the cleaning member 240 during the cleaning operation may be performed as well as after the cleaning operation may be performed.

The controller 260 may identify operational states of the ionizer 100 including the driving of the ionizer 100 through the communication interface 210. The controller 260 may drive the cleaning member 240 through the driver 250 to control the whole operations including removing the foreign substance on the wire 120.

The controller 260 may identify the cleaning time of the cleaning member 240 through the driving information of the cleaning member 240. The controller 260 may compare the identified cleaning time with a reference cleaning time. When the identified cleaning time may be greater than the reference cleaning time, the controller 260 may determine the cleaning member 240 to be abnormal.

For example, the cleaning time of the cleaning member 240 may be an amount of time that the cleaning member 240 moves from the beginning spot to reach the ending spot, that the cleaning member 240 moves from the beginning spot to the ending spot and returns to the beginning spot from the ending spot, or that the cleaning member 240 returns from the ending spot to the beginning spot.

When information that the cleaning member 240 reaches the ending spot is not transmitted to the controller 260 in a first reference time after detecting that the cleaning member 240 starts moving from the beginning spot, the controller 260 may determine the cleaning member 240 to be abnormal. Further, when return information of the cleaning member 240 to the beginning spot is not transmitted to the controller 260 in a second reference time after receiving information of the cleaning member 240 from the beginning spot to the ending spot, the controller 260 may also determine the cleaning member 240 to be abnormal.

The controller 260 may generate and manage the cleaning history including at least one of the date of the cleaning operation of the cleaner 200, an automatic or manual cleaning operation, a cleaning time, data of the cleaning operation, a total number of times that the cleaning operation is performed, a number of times that the cleaning operation is performed after replacement of the cleaning cartridge, etc., based on drive information of the cleaning member 240. The cleaning history may be stored in the memory 230. The data of the cleaning operation may include cleaning results including the normal operation and the abnormal operation.

When the predetermined automatic cleaning conditions is satisfied or the manual cleaning command is inputted, the controller 260 may drive the cleaning member 240 through the driving processor 257 to clean the wire 120. The manual cleaning command may function as to perform the cleaning operation by the cleaning member 240 in accordance with a selection of a specific cleaning button by the worker regardless of the automatic cleaning condition.

The controller 260 may set the automatic cleaning condition including at least one of an automatic cleaning date, an automatic cleaning period, lapsed dates after the latest cleaning operation, a cleaning operable state including an operation stop state of the ionizer 100, etc.

When the cleaning cartridge 241 is to be replaced according to a replacement period or a number of times that the cleaning member 240 operates reaches a threshold number that the cleaning cartridge 241 is to be replaced according to the driving information of the cleaning member 240 and replacement information of the cleaning cartridge 241, the controller 260 may make an alarm of the replacement time of the cleaning cartridge 241.

The replacement information of the cleaning cartridge 241 may include a replacement history of the cleaning cartridge 241 including replacement dates.

The controller 260 may drive or stop the ionizer 100 in accordance with the driving of the cleaning member 240. When the ionizer 100 is not driven, the controller 260 may drive the cleaning member 240 through the driving processor 257.

Figure 7:
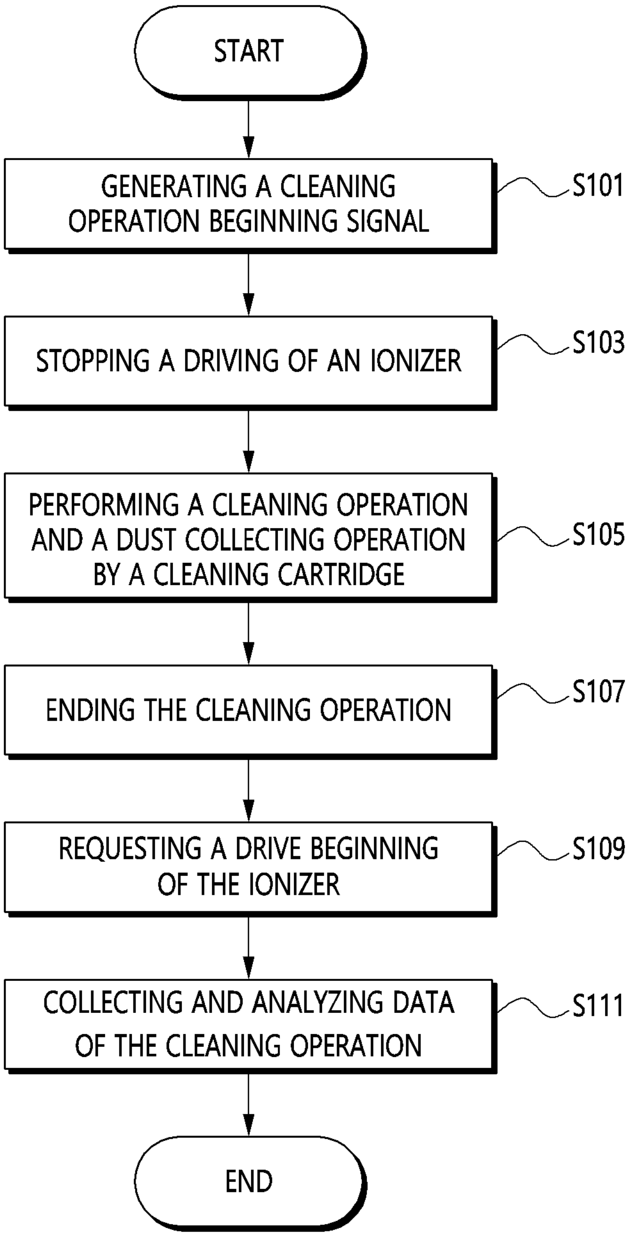
FIG. 7 is a flow chart illustrating a method of operating a cleaner in accordance with example embodiments.

FIG. 7 is a flow chart illustrating a method of operating a cleaner in accordance with example embodiments.

Referring to FIG. 7, in step S101, a cleaning operation beginning signal is generated. In step S103, the cleaner 200 determines whether the ionizer 100 operates or not.

When the predetermined automatic cleaning condition is satisfied, or the manual cleaning command may be inputted, the cleaning operation beginning signal may be generated.

When the ionizer 100 may not be driven, in step S105, the cleaner 200 may drive the cleaning member 240.

The cleaner 200 may perform the cleaning operation by moving the cleaning member 240 from the beginning spot of the wire 120 in the ionizer 100 and by returning the cleaning member 240 to the beginning spot of the wire 120 via the ending spot of the wire 120 to remove the foreign substance on the wire 120.

Here, the cleaner 200 may perform the dust collecting operation to discharge the collected foreign substance to the outside of the ionizer 100.

In one embodiment, when the cleaning member 240 is returned to the beginning spot of the wire 120, the cleaning member 240 may operate, the foreign substance may be detected in the collecting container 243, or the weight of the foreign substance collected in the collecting container 243 may be no less than the predetermined reference weight, the cleaner 200 may perform the dust collecting operation to discharge the collected foreign substance to the outside of the ionizer 100. The cleaner 200 may collect related data including error data, operational results, etc., generated in the dust collecting operation. The related data may be used for analyzing the states of the cleaner 200.

In step S107, when the cleaner 200 is moved along the wire 120 to complete the cleaning operation, the cleaning operation may then be stopped. Here, the cleaner 200 may be stopped due to the abnormal operation of the cleaning member 240.

In step S109, the cleaner 200 transmits the drive beginning request signal to the ionizer 100.

In step S111, the cleaner 200 collects and analyzes the data generated in the cleaning operation.

In one embodiment, the cleaner 200 may generate the cleaning history including at least one of the date of the cleaning operation of the cleaner 200, an automatic or manual cleaning operation, a cleaning time, data of the cleaning operation, a total number of times that the cleaning operation is performed, a number of times that the cleaning operation is performed after replacement of the cleaning cartridge, etc.

The cleaner 200 may collect the operational states of the ionizer 100.

In various embodiments, generating the cleaning history and collecting the operational states of the ionizer 100 may be changed by the worker.

The cleaner 200 may output the alarm message indicating at least one of the operation error of the cleaning member 240, the replacement time of the cleaning cartridge 241 and the operation error of the ionizer 100 based on the cleaning history and the operational states of the ionizer 100.

The above-mentioned steps S109 and S111 may be necessarily changed into each other by the worker.

Further, the step S111 may not be limited to be performed after the cleaning operation. For example, data, which may be collected in real time, among the data generated in the cleaning operation may be received and analyzed. The control signal may be generated in real time based on the analyzed data to collect and analyze the data in real time.

Figure 8:
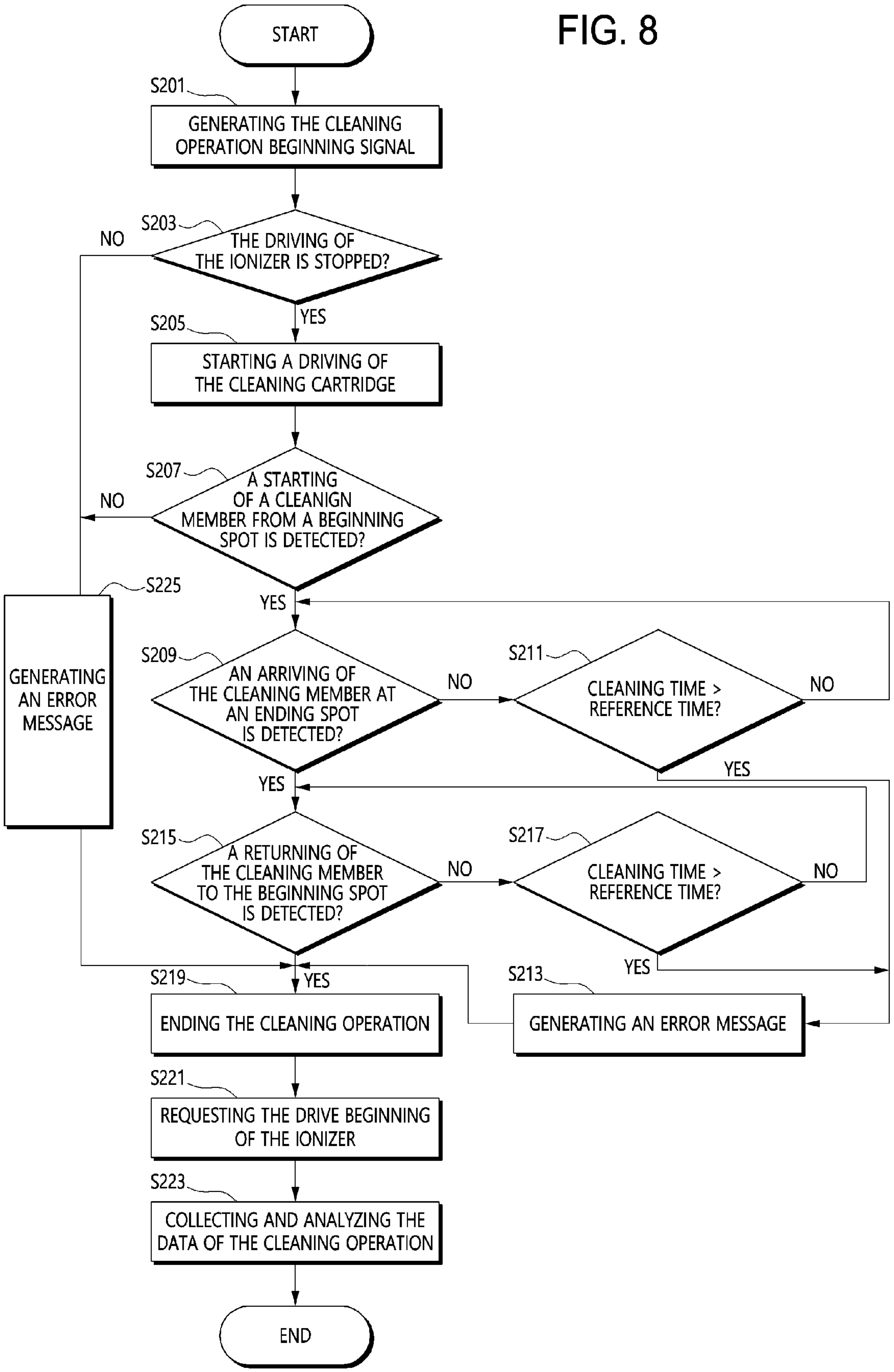
FIG. 8 is a detailed flow chart illustrating the method in FIG. 7.

FIG. 8 is a detailed flow chart illustrating the method in FIG. 7.

Referring to FIG. 8, in step S201, the cleaning operation beginning signal is generated. In step S203, the cleaner 200 determines whether the ionizer 100 operates or not.

When the ionizer 100 may not be driven, in step S205, the cleaner 200 may drive the cleaning member 240.

In step S207, the cleaner 200 detects whether the cleaning member 240 has started moving from the beginning spot or not.

Although not depicted in drawings, when the cleaner 200 may detect that the cleaning member 240 has started moving from the beginning spot, the cleaner 200 may check a first cleaning time elapsed from the detected time. That is, the first cleaning time may be an amount of time from when the cleaning member 240 starts moving to a current time.

In step S209, the cleaner 200 determines whether the cleaning member 240 has arrived at the ending spot or not.

In step S211, when the cleaning member 240 has not reached the ending spot, the cleaner 200 determines whether the first cleaning time is greater than a first reference time or not.

When the first cleaning time is greater than the first reference time, in step S213, the cleaner 200 may determine the cleaning member 240 to be abnormal to generate the error message. Processes after step S219 may then be performed.

In contrast, when the first cleaning time is greater than the first reference time, the cleaner 200 may repeat the process in step S209.

When the cleaning member 240 arrives at the ending spot, in step S215, the cleaner 200 may determine whether the cleaning member 240 returns to the beginning spot or not.

Although not depicted in drawings, when the cleaner 200 detects that the cleaning member 240 has reached the ending spot, the cleaner 200 may check a second cleaning time. The second cleaning time may be an amount of time from when the cleaning member 240 starts moving and returns from the ending spot to a current time. Alternatively, the second cleaning time may be an amount of time from when the cleaning member 240 reaches the ending spot to the current time.

When the cleaning member 240 is not returned to the beginning spot, in step S217, the cleaner 200 determines whether the second cleaning time is greater than a second reference time or not.

When the second cleaning time is greater than the second reference time, in step S213, the cleaner 200 may determine the cleaning member 240 to be abnormal to generate the error message. Processes after step S219 may then be performed.

In contrast, when the second cleaning time is not greater than the second reference time, the cleaner 200 may repeat the process in step S215.

When the cleaner 200 detects the return of the cleaning member 240 to the beginning spot, in step S219, the cleaning operation is stopped.

In step S221, the cleaner 200 requests and may transmit a drive beginning signal to the ionizer 100.

In step S223, the cleaner 200 collects and analyzes the data generated in the cleaning operation.

In various embodiments, the steps S221 and S223 may be necessarily changed into each other by the worker.

When the ionizer 100 may operate in step S203, an error message including corresponding reason may be generated in step S225. Then, step S223 may be performed.

When it is not detected that the cleaning member 240 starts moving from the beginning spot in step S207, the cleaner 200 may generate the error message including the abnormal operation of the cleaning member 240. The processes after step S219 may then be performed.

Figure 9A:
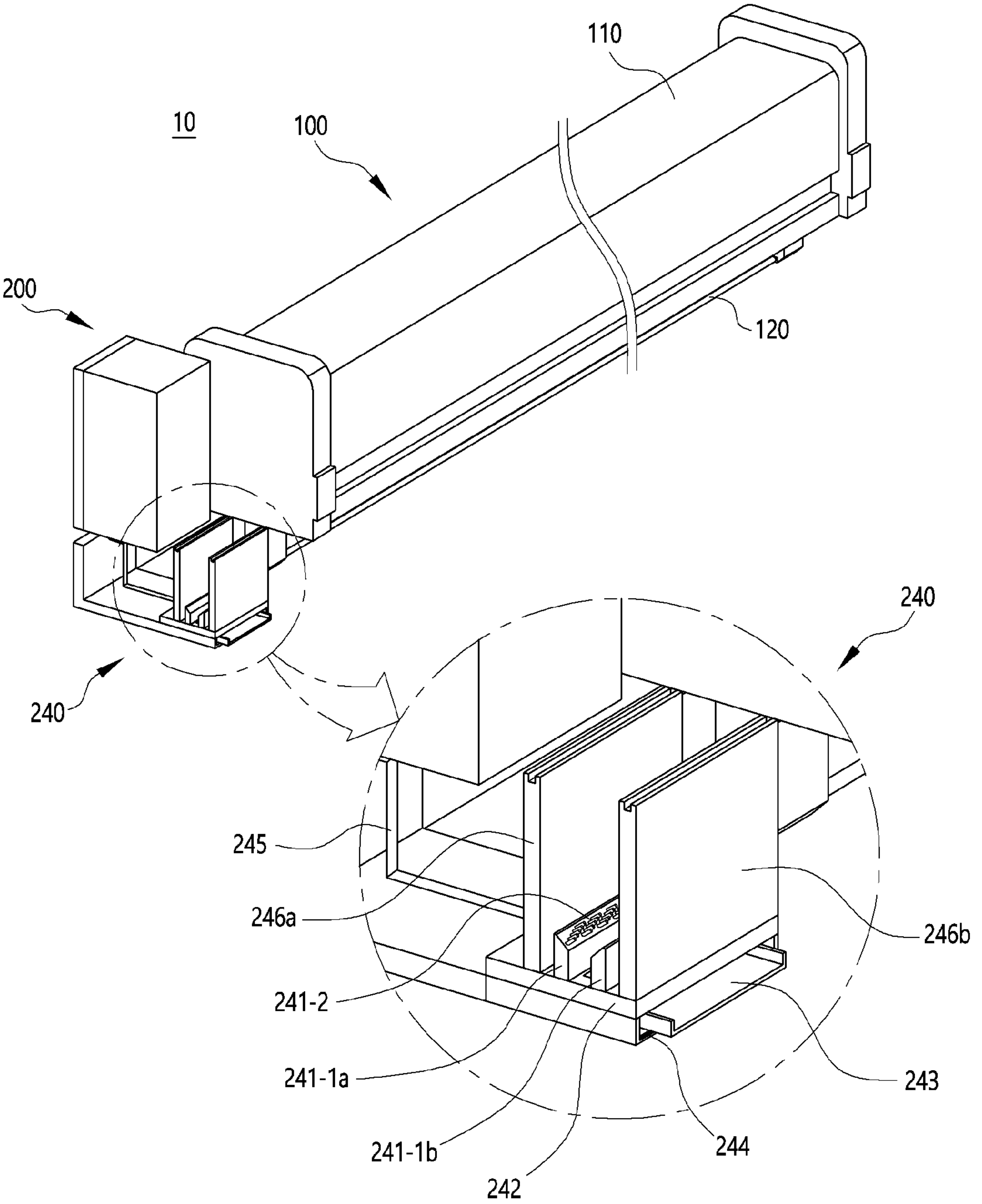
FIGS. 9A, 9B and 10 are views illustrating an ionizer cleaning system in accordance with example embodiments.
Figure 9B:
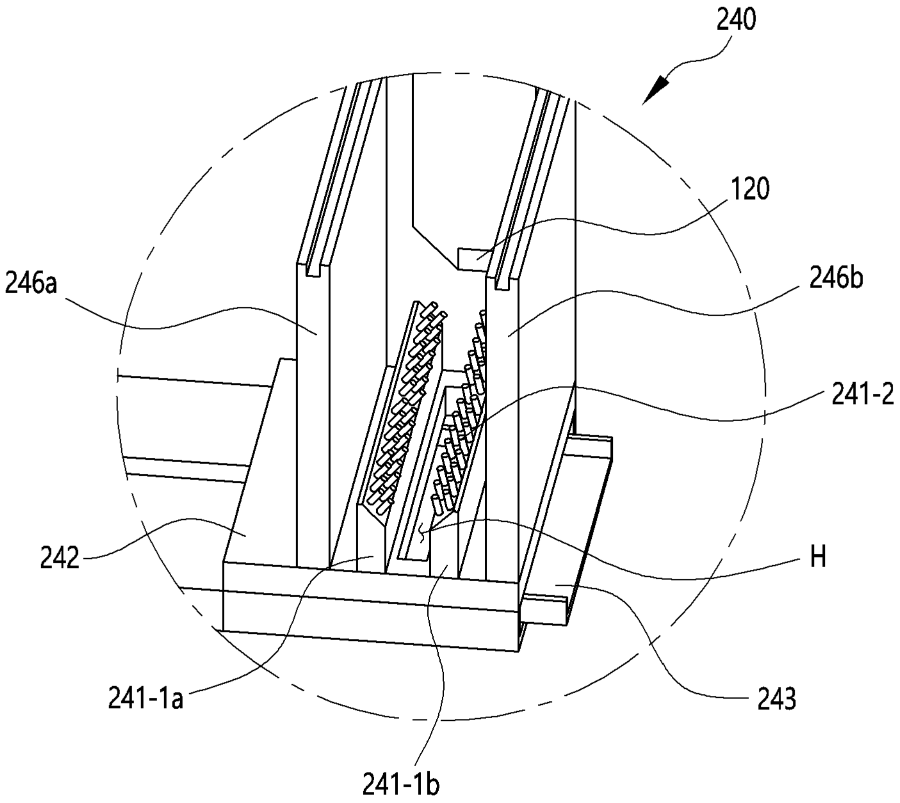
Figure 10:
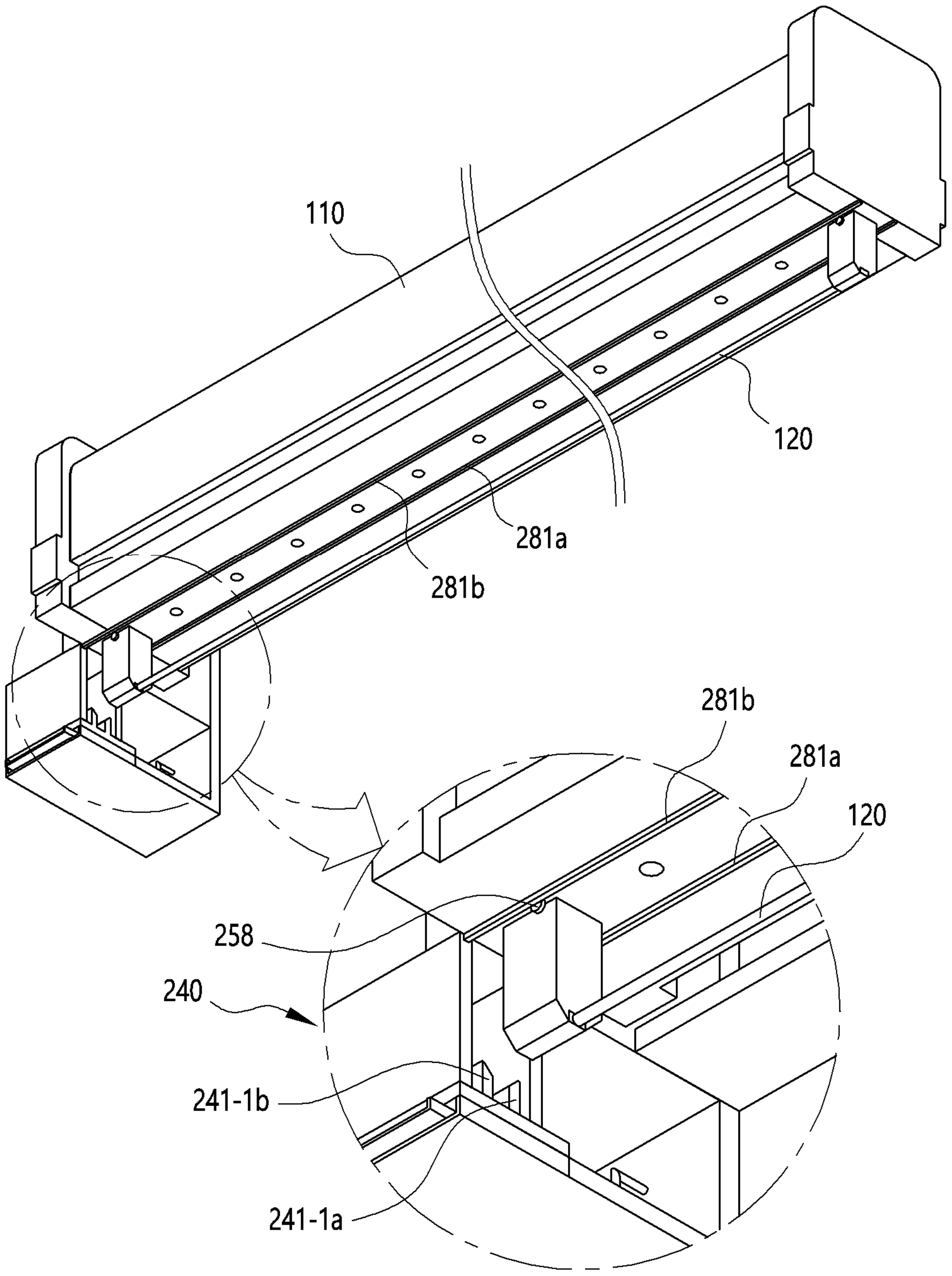
Figure 11:
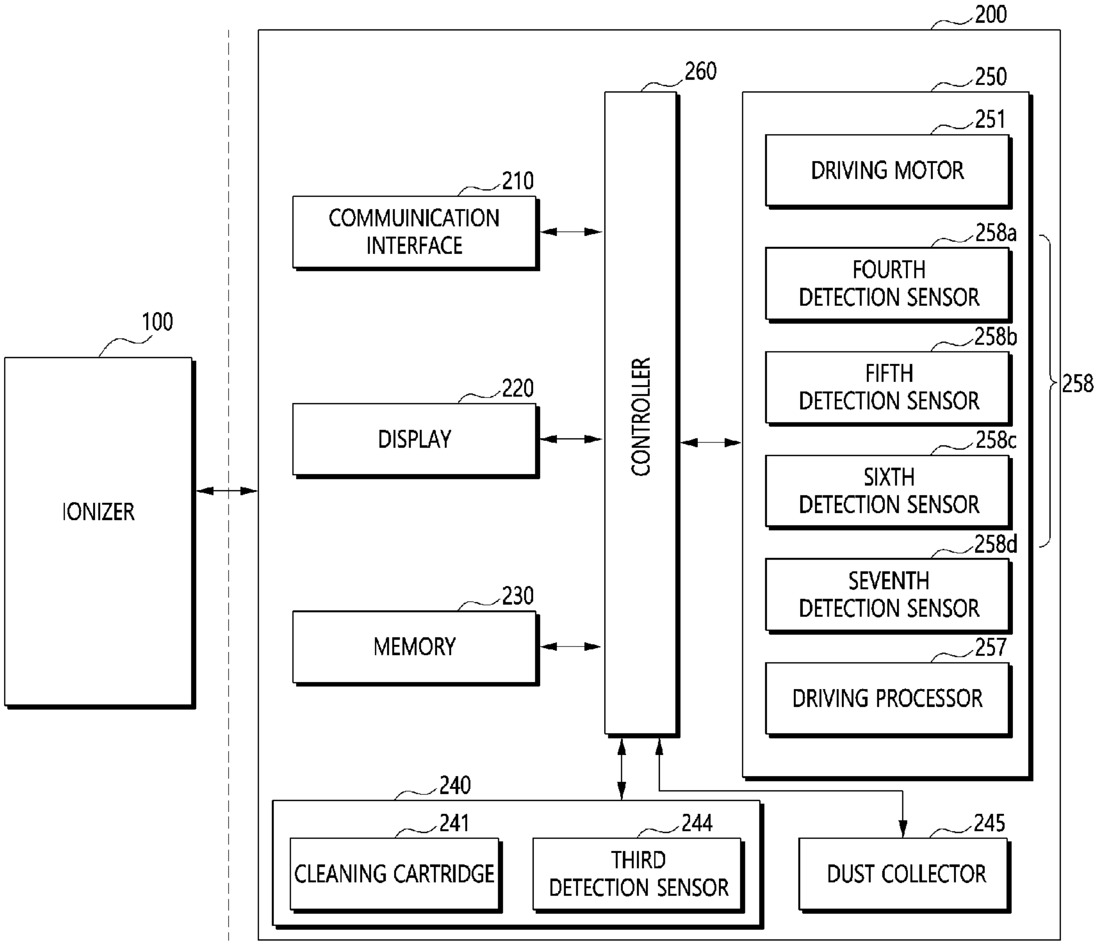
FIG. 11 is a block diagram illustrating a cleaner in accordance with example embodiments.

FIGS. 9A, 9B and 10 are views illustrating an ionizer cleaning system in accordance with various embodiments, and FIG. 11 is a block diagram illustrating a cleaner in accordance with example embodiments.

Referring to FIG. 11, a cleaner 200 may include a communication interface 210, a display 220, a memory 230, a cleaning member 240, a dust collector 245, a driver 250 and a controller 260.

The communication interface 210 may be interfaced with the ionizer 100 to transmit and receive information to and from the ionizer 100.

The display 220 may display all information with respect to operations of the cleaner 200. The information may include a history of cleaning, automatic clean information, a replacement time of a cleaning cartridge, a replacement history of the cleaning cartridge, a number of times that the cleaning member 240 cleans the wire 120, etc.

The cleaning history may include at least one of a time of a cleaning operation of the cleaner 200, an automatic or manual operation of the cleaning operation, a time of the cleaning operation, data of the cleaning operation, a total number of times that the cleaning operation is performed, a number of times that the cleaning operation is performed after replacement of the cleaning cartridge, etc., based on drive information of the cleaning member 240.

When an alarm is made for the replacement time of the cleaning cartridge, the alarm may include additionally displaying a number of times that the cleaning cartridge operates as well as the replacement time of the cleaning cartridge.

The memory 230 may store information with respect to the cleaner 200.

The cleaning member 240 may move along the wire 120 of the ionizer 100 to remove and collect the foreign substance. That is, the cleaning cartridge 241 may make contact with the wire 120 to release the foreign substance from the wire 120. The released foreign substance may then be collected in the collecting container 243.

The cleaning member 240 may include a cleaning cartridge 241 and a third detection sensor 244.

Referring to FIGS. 9A and 9B, the cleaning cartridge 241 may include first and second bodies 241-1*a* and 241-1*b* and a cleaning brush 241-2. The first body 241-1*a* may be formed at one side of the wire 120 during the cleaning member 240 may move along the wire 120. The second body 241-1*b* may be formed at the other side of the wire 120 during the cleaning member 240 may move along the wire 120. Thus, the first and second bodies 241-1*a* and 241-1*b* may face each other to cover the wire 120 for example in a perpendicular direction to a longitudinal direction of the wire 120 and may be spaced apart from each other. The cleaning brush 241-2 may be formed on an inner surface of each of the first and second bodies 241-1*a* and 241-1*b* to remove the foreign substance on the wire 120.

Additionally, the cleaning member 240 may further include the pedestal 242, a collecting container 243 and first and second guides 246*a* and 246*b*. The pedestal 242 may be connected to the cleaning cartridge 241.

Referring to FIG. 9B, the pedestal 242 may be arranged under the first and second bodies 241-1*a* and 241-1*b*. The pedestal 242 may include a collecting hole H formed at a region between the first and second bodies 241-1*a* and 241-1*b*.

The collecting container 243 may be arranged under the pedestal 242 to collect the foreign substance through the collecting hole H.

Referring to FIGS. 9A and 10, the first guide 246*a* may have one surface configured to make contact with an upper surface of the pedestal 242, and the other surface configured to make contact with a first rail 281*a* when the cleaning member 240 may operate. The other surface of the first guide 246*a* may move along the first rail 281*a*.

Referring to FIGS. 9A and 10, the second guide 246*b* may have one surface configured to make contact with the upper surface of the pedestal 242, and the other surface configured to make contact with a second rail 281*b* when the cleaning member 240 may operate. The other surface of the second guide 246*b* may move along the second rail 281*b*.

Referring to FIG. 9A, the third detection sensor 244 may be configured to detect the weight of the foreign substance collected in the collecting container 243.

Referring to FIG. 9A, the cleaning member 240 may move along the wire 120 during the cleaning operation. In various embodiments, the cleaning cartridge 241, the pedestal 242, the collecting container 243, the third detection sensor 244 and the first and second guides 246*a* and 246*b* may move along the wire 120.

The dust collector 245 may be connected to the collecting container 243. The dust collector 245 may inhale the foreign substance collected in the collecting container 243.

Although not depicted in drawings, the dust collector 245 may further include a structure configured to intake air for inhaling the foreign substance, a pipe configured to guide the foreign substance to the outside of the ionizer 100, etc.

The dust collector 245 may perform a dust collecting operation including inhaling the foreign substance and discharging the foreign substance. When the cleaning member 240 is returned to a beginning spot of the wire 120, the cleaning member 240 may operate to detect the foreign substance in the collecting container 243, or determine the weight of the foreign substance collected in the collecting container 243 may be no less than a predetermined reference weight.

Referring to FIG. 10, the cleaner 200 may further include a driving rail including the first rail 281*a* and the second rail 281*b*. The first and second rails 281*a* and 218*b* may be detachably disposed at one surface of the ionizer 100. The first and second rails 281*a* and 281*b* may function as to contact the cleaning brush 241-2 of the cleaning member 240 with the wire 120 during the cleaning member 240 may operate.

As shown in FIG. 10, the first and second rails 218*a* and 281*b* may be arranged on the lower surface of the body 110 of the ionizer 100.

The driver 250 may be configured to drive the cleaning member 240. The driver 250 may detect that the cleaning member 240 starts moving from a beginning spot of the wire 120, reaches an ending spot of the wire 120 or returns to the beginning spot of the wire 120.

Referring to FIG. 11, the driver 250 may include a first driving motor 251, a fourth detection sensor 258*a*, a fifth detection sensor 258*b*, a sixth detection sensor 258*c*, a seventh detection sensor 258*d* and a driving processor 257.

The driving motor 251 may be configured to drive the cleaning member 240.

The fourth and fifth detection sensors 258*a* and 258*b* may be positioned at the beginning spot of the wire 120 adjacent to the first and second rails 281*a* and 281*b* to detect that the cleaning member 240 starts moving from and returns to the beginning spot of the wire 120.

The sixth and seventh detection sensors 258*c* and 258*d* may be positioned at the ending spot of the wire 120 adjacent to the first and second rails 281*a* and 281*b* to detect that the cleaning member 240 reaches the ending spot of the wire 120.

At least one of the fourth to seventh detection sensors 258*a*, 258*b*, 258*c* and 258*d* may be a position sensor including at least one of a contact type sensor and a non-contact type sensor.

The driving processor 257 may be configured to drive and stop the driving motor 251 in accordance with the controls of the controller 260. The driving processor 257 may transmit the driving information of the cleaning member 240 including the cleaning time, a return time, etc., obtained based on the detection information provided from the fourth to seventh detection sensors 258*a*, 258*b*, 258*c* and 258*d*. The driving processor 257 may transmit the driving information of the cleaning member 240 during the cleaning operation may be performed as well as after the cleaning operation may be performed.

The controller 260 may identify states of the ionizer 100 including the driving of the ionizer 100 through the communication interface 210. The controller 260 may drive the cleaning member 240 through the driver 250 to control the whole operations including removing the foreign substance on the wire 120.

Figure 12:
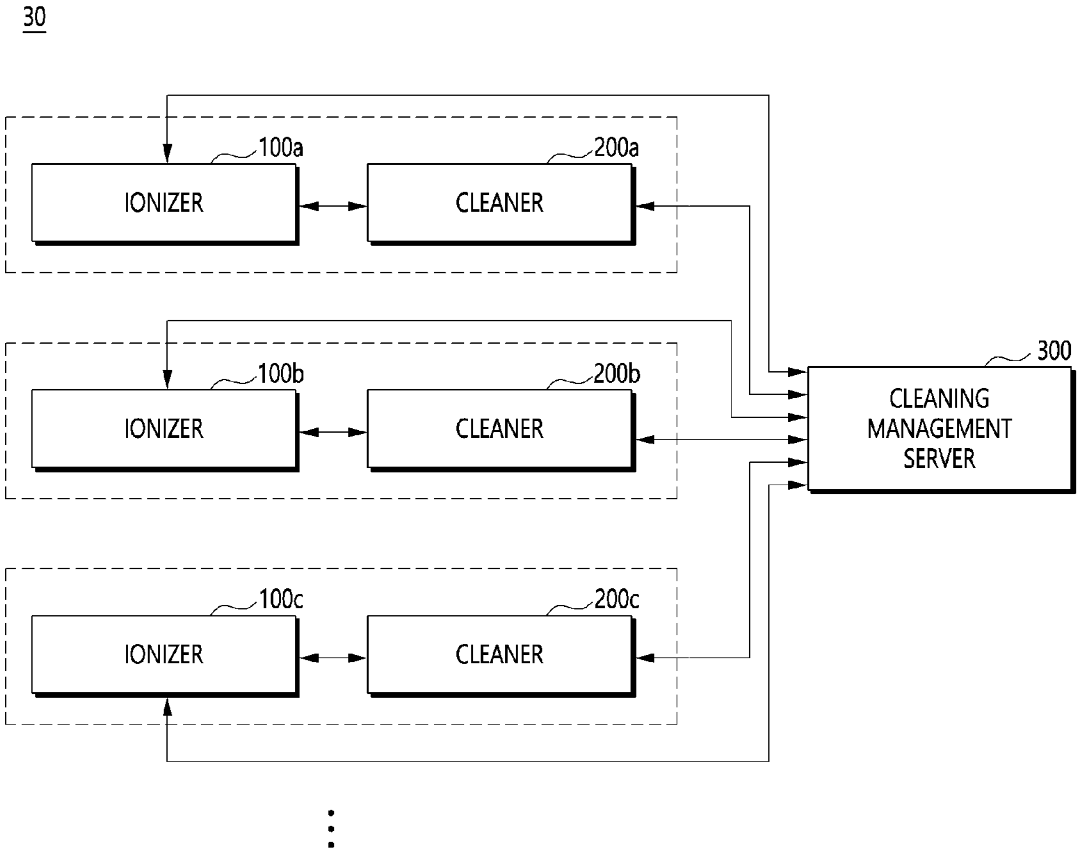
FIG. 12 is a block diagram illustrating an ionizer cleaning system in accordance with example embodiments.

FIG. 12 is a block diagram illustrating an ionizer cleaning system in accordance with various embodiments, The ionizer cleaning system in one embodiment may include elements substantially the same as or similar to the elements illustrated with reference to FIGS. 1 to 11. Thus, any further illustrations with respect to the same elements may be omitted herein for brevity.

Further, cleaner 200 in one embodiment may be applied to the cleaners in FIGS. 1 and 9.

Referring to FIG. 12, an ionizer cleaning system 30 may include a plurality of ionizers 100*a*, 100*b*, 100*c*, . . . , a plurality of cleaners 200*a*, 200*b*, 200*c*, . . . , and a cleaning management server 300.

Identification information may be allotted to each of the ionizers 100*a*, 100*b*, 100*c*, . . . .

The cleaners 200*a*, 200*b*, 200*c*, . . . , may be detachably disposed at the ionizers 100*a*, 100*b*, 100*c*, . . . . Identification information may be allotted to the cleaners 200*a*, 200*b*, 200*c*, . . . .

The cleaning management server 300 may control the ionizers 100*a*, 100*b*, 100*c*, etc., and the cleaners 200*a*, 200*b*, 200*c*, etc. The cleaning management server 300 may check the drive states of the ionizers 100*a*, 100*b*, 100*c*, etc. The cleaning management server 300 may drive the cleaners 100*a*, 100*b*, 100*c*, etc., based on the drive states of the ionizers 100*a*, 100*b*, 100*c*, etc., to remove the foreign substance from the wire 120.

The functions of the cleaning management server 300 may be substantially the same as or similar to the functions of the controller illustrated with reference to FIGS. 1 to 10. The cleaning management server 300 may further include a function for wholly managing the ionizers 100*a*, 100*b*, 100*c*, etc., and the cleaners 200*a*, 200*b*, 200*c*, etc.

Signals may be transmitted between the ionizers 100*a*, 100*b*, 100*c*, etc., and the cleaners 200*a*, 200*b*, 200*c*, etc., based on the identification information allotted to the ionizers and cleaners when the cleaning management server 300 may totally manage the ionizers 100*a*, 100*b*, 100*c*, etc., and the cleaners 200*a*, 200*b*, 200*c*, etc.

In example embodiments, a cleaner for an ionizer and an ionizer cleaning system may further include a cover frame 400.

The cover frame 400 may be configured to receive the ionizer 100 and a part of the cleaner 200. The cover frame 400 may cover the wire 120 to prevent the wire 120 from being damaged. The cover frame 400 may prevent foreign substances from infiltrating into the ionizer 100 and thereby prevent foreign matter such as for example fuzz balls from being generated in the ionizer 100, thereby preventing the wire 120 from being damaged. Further, after the reciprocal operation of the cleaner 200, the cover frame 400 may provide a storage space for storing trapped foreign substances.

Figure 13:
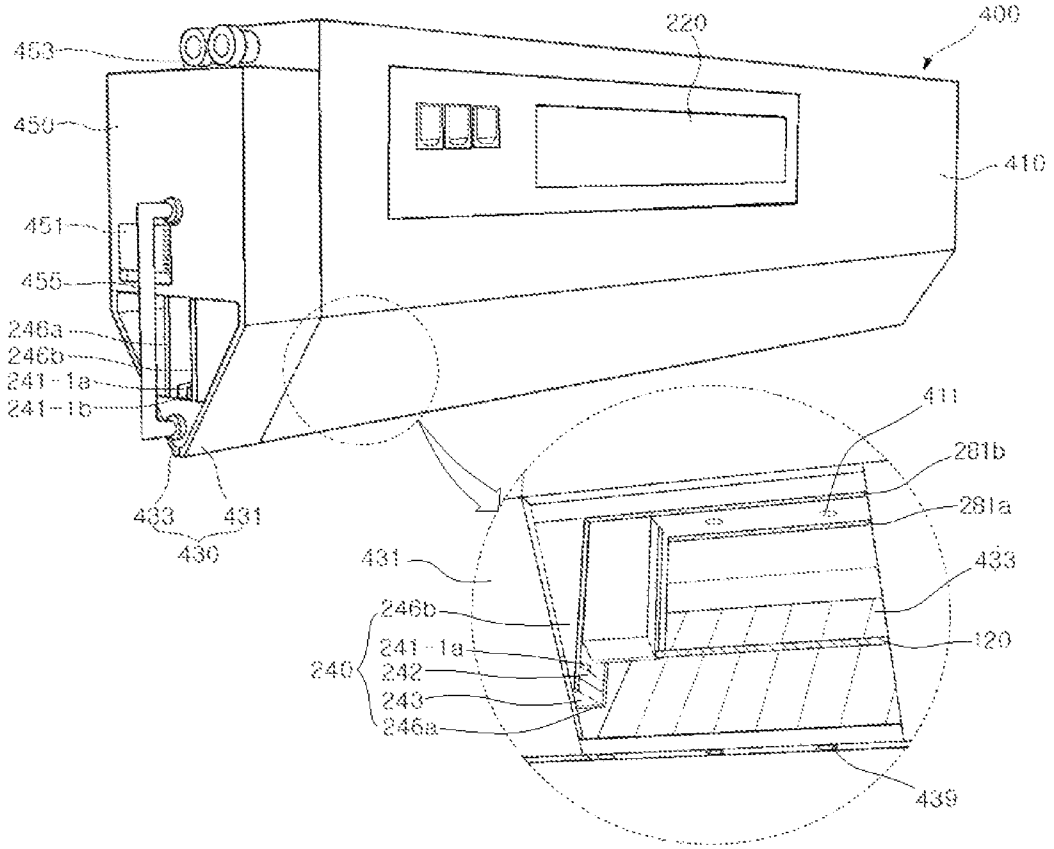
FIG. 13 is a view illustrating an ionizer cleaning system in accordance with example embodiments.
Figure 14:
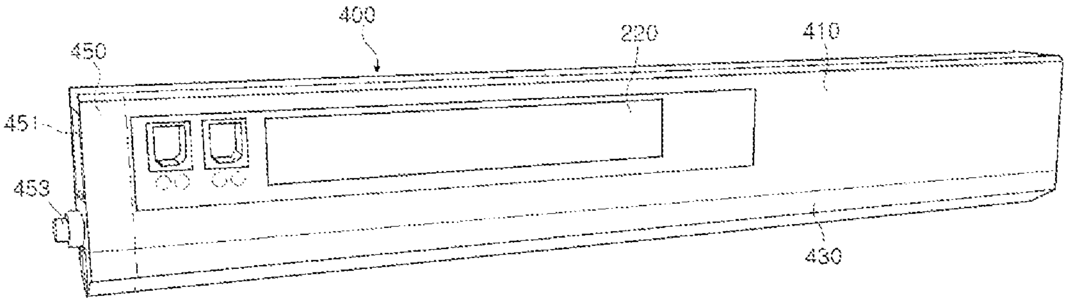
FIG. 14 is a front view diagram illustrating an ionizer cleaning system in accordance with example embodiments.
Figure 15:
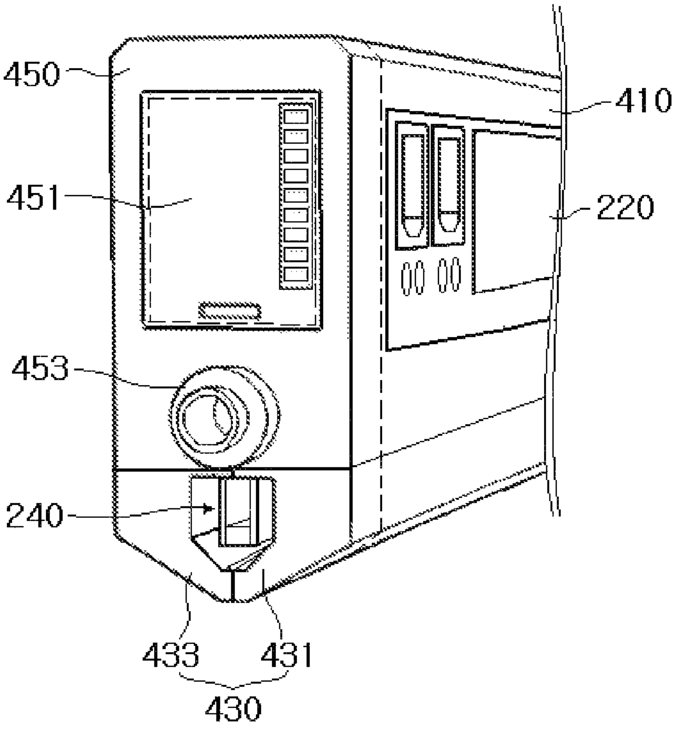
FIG. 15 is a side view illustrating an ionizer cleaning system in accordance with example embodiments.
Figure 16:
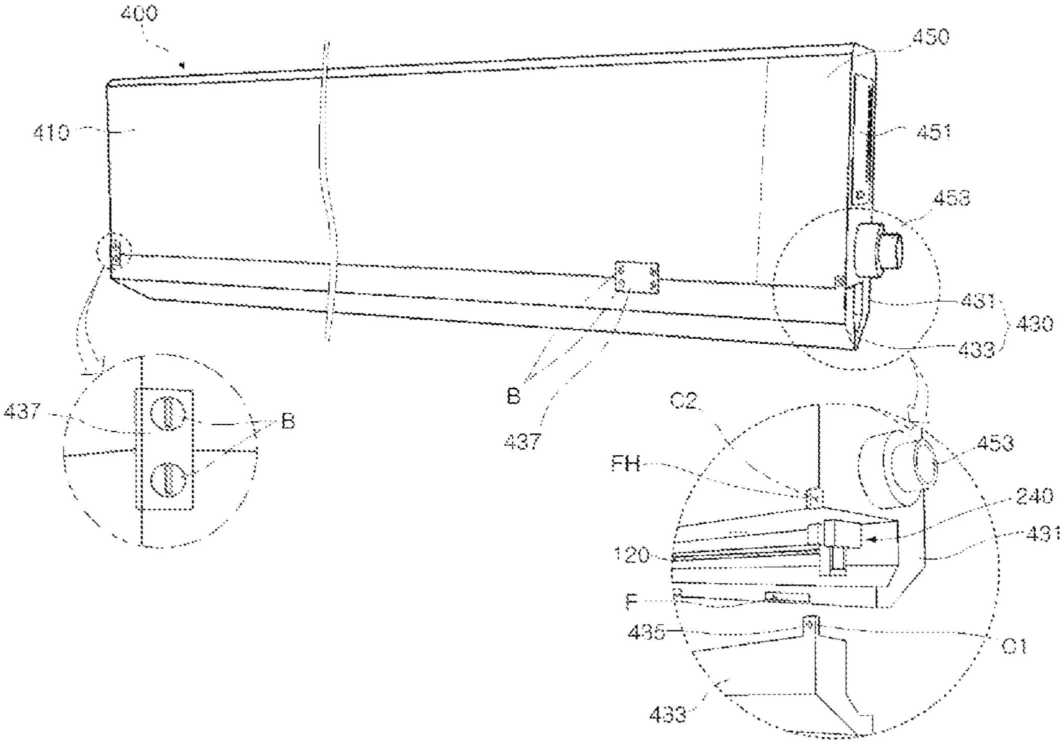
FIG. 16 is a rear view illustrating an ionizer cleaning system in accordance with example embodiments.

FIG. 13 is a view illustrating an ionizer cleaning system in accordance with example embodiments, FIG. 14 is a front view diagram illustrating an ionizer cleaning system in accordance with example embodiments, FIG. 15 is a side view illustrating an ionizer cleaning system in accordance with example embodiments, and FIG. 16 is a rear view illustrating an ionizer cleaning system in accordance with example embodiments.

Elements in FIGS. 13 to 16 may have functions substantially the same as or similar to the functions of the elements in FIGS. 1 to 12. Thus, any further illustrations with respect to the same elements may be omitted herein for brevity.

Further, the cover frame 400 may be applied to the cleaners in FIGS. 1 and 9.

Referring to FIGS. 13 to 16, the cover frame 400 may include a body container 410 and a wire container 430.

The body container 410 may have a receiving space configured to receive the body 110 of the ionizer to protect the body 110 of the ionizer. The body container 410 may receive parts of the cleaner 200 such as the communication interface 210, the memory 230, etc. The display 220 may be installed on an outer surface of the body container 410. In example embodiments, the body container 410 may have a hexahedral structure formed by a plurality of protection panels, not limited thereto. For example, the body container 410 may have a tubular shape including an opened lower surface. The tubular shape may have a circular cross-section, an elliptical cross-section, a polygonal cross-section, etc.

The wire container 430 may be arranged under the body container 410. The wire container 430 may have a receiving space configured to receive and protect the wire 120, the cleaning member 240, the driver 250, the controller 260, the driving rail 270, etc. of the ionizer. The wire container 430 may have one opened surface, or two or more opened surfaces to allow for circulation of air. Further, the user may verify the condition of the receiving space of the wire container 430 through the opened surface(s). The wire container 430 may have a downwardly slanted surface, not limited thereto. For example, the wire container 430 may include a tubular shape having a circular cross-section, an elliptical cross-section, a polygonal cross-section, etc.

The first and second bodies **241-1*a* and 241-1*b*, the pedestal 242, the collecting container 243 and the first and second guides 246*a* and 246*b* in the cleaning member 240 may have the shape illustrated in FIG. 13, configured to be received in the wire container 430. Further, the first and second rails 281*a* and 281*b* (for the movements of the first and second guides 246*a* and 246*b*) may be arranged over the wire 120. The first and second rails 281*a* and 281*b* may be contained in the wire container 430**.

At least one ion discharge hole 439 may be formed through the wire container 430. The cations and the anions, which may be generated by the discharge of the wire 120 by applying the high voltage to the wire 120 from the power supply, may flow from the wire container 430 through the ion discharge hole(s) 439. The power supply may provide the ionizer 100 and the cleaner 200 with the power.

The cover frame 400 may further include a dust container 450 arranged at one side of the body container 410 and the wire container 430. The dust container 450 may be configured to have a dust collector 451.

The dust collector 451 may have a storage space configured to store the foreign substances trapped after completing the cleaning operation of the cleaner 200. The dust collector 451 may receive air flow from the wire container 430 which may contain foreign substances formerly residing in the wire container 430. The dust collector 451 may separate the foreign substances from the air flow by trapping the foreign substances so that the wire may no longer be exposed to those foreign substances removed from the wire container 430. The dust collector 451 may then collect the foreign substances. Particularly, external air may be supplied into the wire container 430 through an air passage 453 to generate an air entraining foreign substances therein. The dust collector 451 may receive the air with the foreign substances. The dust collector 451 can function to collect the foreign substances from the air flow and store the foreign substances away from the wire 120.

The dust collector 451 may include an air intake passage. The intake passage may be connected to at least one intake duct. The intake duct may be arranged in the wire container 430 with the wire 120. A vacuum pump may be connected to the intake duct to draw the air with the foreign substances through the intake duct. The intake duct may also be connected to an air passage to intake the air including the foreign substances. The vacuum pump may be controlled by a controller. After operating a pneumatic pump, the vacuum pump may then be operated.

The dust collector 451 may include a filter configured to separate the foreign substances from the air flow. The dust collector 451 may include an exhaust hole configured to discharge the air without the foreign substances.

The dust collector 451 may be detachably installed at the dust container 450 to remove the foreign substances collected in the dust collector 451.

The dust collector 451 may be connected to the collecting container 243. Thus, foreign substances in the collecting container 243 may be removed from the dust container 451.

The dust collector 451 may further include a particle detection sensor. The particle detection sensor may be installed at the exhaust hole of the dust collector 451 to detect a concentration of the foreign substances. The particle detection sensor may then transmit the detected concentration of the foreign substances to the controller 260. When the detected concentration of the foreign substances is beyond a set value, the controller 260 may control the display 220 to display a discharge signal on the display 220, thereby alerting the user to remove the foreign substances from the dust collector 451.

The ionizer cleaning system of example embodiments may include various air supply configurations.

For example, as shown in FIG. 13, the air passage 453 may be formed at an upper portion of the body container 410. The air passage 453 may be connected to the air duct 455 protruded from the dust container 450 to supply the air to an upper space or a lower space of the cleaning member 240. The body container 410 may include an air hole 411 connected with the air passage 453 through the air duct 455 to discharge the air into the wire container 430 through the air passage 453. The at least one air hole 411 may be formed between the driving rails 281*a* and 281*b*.

In order to intake the air with the foreign substances into the dust collector 451, the controller 260 may control the supply of the air through the air passage 453 so that the air may be supplied after removing the foreign substances from the wire 120 by the cleaning member 240. The air duct 455 may be connected to a pneumatic pump controlled by the controller 260. When the air with the foreign substances enters into the dust collector 451, the controller 260 may stop the wire 120.

The at least one air hole 411 may be formed through an upper surface of the wire container 430. The air hole 411 may be connected to the air passage 453 to supply the air from the air passage 453 into the wire container 430. Further, the air hole 411 may apply a pneumatic pressure to the cations and the anions, which may be generated by the discharge of the wire 120 by applying the high voltage to the wire 120, to propel the cations and the anions through an ion exhaust hole 439. The air hole 411 may be connected to the intake duct so that the air with the foreign substances in the wire container 430 may pass through the air hole 411.

As shown FIGS. 14 to 16, the air passage 453 may be formed at one side of the dust container 450. The air may be supplied to the upper space of the cleaning member 240 through the air passage 453 into the dust container 450.

A door may be installed for the dust container 450. The dust collector 451 in the dust container 450 may be moved through the door to remove the foreign substances from the dust collector 451. The dust collector 451 without the foreign substances, may then be moved into the dust container 450 through the door.

For cleaning the wire, the cleaning member may be moved between the beginning spot of the wire to the ending spot of the wire and then back to the beginning spot of the wire, foreign substances may be removed from the wire. The air may then be supplied to the position adjacent to the wire, i.e., the receiving space of the wire container, to generate the air with the foreign substances in the receiving space. The air with the foreign substances may be collected in the dust collector. The foreign substances in the dust collector may then be removed from the dust container 450 by use of the door discussed above.

In cover frame 400 of example embodiments, the wire container 430 may be detachably connected to the body container 410 to repair and maintain the wire 120. The wire container 430 may include a front cover 431 and a rear cover 433.

The front cover 431 may be integrally installed at a lower portion of a front surface of the body container 410. The rear cover 433 may be detachably installed at a lower portion of a rear surface of the body container 410. Alternatively, the front cover 431 may be detachably installed at the lower portion of the front surface of the body container 410. The rear cover 433 may be integrally installed at the lower portion of the rear surface of the body container 410.

Referring to FIG. 16, the rear cover 433 configured to form the wire container 430 may include a fixing protrusion 435. The fixing protrusion 435 may be formed at both sides of an upper portion of the rear cover 433. A first connection hole C1 may be formed through the fixing protrusion 435. At least one threaded protrusion may be formed at the rear cover 433. The body container 410 may include a fixing groove FH formed at a lower portion of a rear surface of the body container 410, and a second connection hole C2 formed through the fixing groove FH. The fixing protrusion 435 may be inserted into the fixing groove FH of the body container 410. A fixing member B such as a bolt may be threaded into the first connection hole C1 and the second connection hole C2 to fix the upper portion of the rear cover 433 to the lower surface of the body container 410. The threaded protrusion of the rear cover 433 may be inserted into a fixing groove F formed at the lower surface of the front cover 431 to combine the rear cover 433 with the front cover 431.

The rear cover 433 may include a first fixing groove and a first fixing hole. The first fixing groove may be formed at both ends of the upper portion of the rear cover 433. The first fixing hole may be formed at one side of the upper portion of the rear cover 433. The rear cover 433 may further include a fixing block 437. At least one fixing protrusion may be formed at the lower surface of the rear cover 433. The body container 410 may include a second fixing groove and a second fixing hole corresponding to the first fixing groove and the first fixing hole, respectively. A fixing groove F may be formed at the lower surface of the front cover 431. Thus, after installing the rear cover 433 at the lower surface of the body container 410, the fixing block 437 may be inserted into the first fixing groove and the second fixing groove. A fixing member B such as a bolt may be threaded into the first fixing hole and the second fixing hole to fix the upper portion of the rear cover 433 to the lower portion of the body container 410. The fixing protrusion of the rear cover 433 may be inserted into the fixing groove F of the front cover 431 to fix the rear cover 433 to the front cover 431. The two fixing members may be used at the upper portion and the lower portion of the fixing block 437, not limited thereto. For example, each of the two fixing members may be used at the upper portion of the lower portion of the fixing block 437, respectively.

Therefore, the rear cover 433 may be readily detached from the wire container 430 for repair or inspection of wire 120.

The functions of the cleaning management server 300 may be substantially the same as or similar to the functions of the controller illustrated with reference to FIGS. 1 to 16. The cleaning management server 300 may further include a function for wholly or in part managing the ionizers 100*a*, 100*b*, 100*c*, etc., and the cleaners 200*a*, 200*b*, 200*c*, etc.

The above described embodiments of the present invention are intended to illustrate and not to limit the present invention. Various alternatives and equivalents are possible. The invention is not limited by the embodiments described herein. Nor is the invention limited to any specific type of semiconductor device. Another additions, subtractions, or modifications are obvious in view of the present disclosure and are intended to fall within the scope of the appended claims.

What is claimed is:

1. A cleaner for an ionizer, the cleaner comprising:

a communication interface configured to transmit/receive information to/from the ionizer;

a cleaning member configured to move along a wire of the ionizer to remove and collect a foreign substance gathered on the wire;

a driver configured to:

drive the cleaning member, and detect that the cleaning member starts moving from a beginning spot of the wire, reaches an ending spot of the wire or returns to the beginning spot of the wire; and a controller configured to:

determine whether the ionizer is operating or not, and control the driver to drive the cleaning member for the cleaning member to remove the foreign substance on the wire, wherein the cleaning member comprises:

a cleaning cartridge including first and second bodies arranged at both sides of the wire to be spaced apart from each other when the cleaning member moves along the wire; and a cleaning brush arranged on an inner surface of each of the first and second bodies to remove the foreign substance from the wire.

2. The cleaner of claim 1, wherein the driver comprises:

a driving motor configured to drive the cleaning member;

a first detection sensor positioned at the beginning spot of the wire to detect that the cleaning member starts moving from or returns to the beginning spot;

a second detection sensor positioned at the ending spot of the wire to detect that the cleaning member reaches the ending spot; and a driving processor configured to drive and stop the driving motor under control of the controller and to transmit to the controller driving information, which includes a cleaning time and a returning time obtained from detection information provided from the first and second detection sensors, and wherein at least one of the first and second detection sensors comprises a position sensor.

3. The cleaner of claim 2, wherein the cleaning member further comprises:

a pedestal arranged under the first and second bodies, the pedestal having a collecting hole formed at a region between the first and second bodies; and a collecting container arranged under the pedestal to collect the foreign substance through the collecting hole.

4. The cleaner of claim 3, wherein the cleaning member further comprises a dust collector to inhale and discharge the foreign substance collected in the collecting container.

5. The cleaner of claim 4, wherein the dust collector is configured to perform a dust collecting operation to inhale and discharge the foreign substance when the cleaning member returns to the beginning spot of the wire, when the cleaning member is operating, when the foreign substance collected in the collecting container is detected, or when the weight of the foreign substance collected in the collecting container is greater than a reference weight.

6. The cleaner of claim 2, wherein the controller is further configured to:

identify the cleaning time of the cleaning member through the driving information of the cleaning member, and compare the cleaning time with a reference cleaning time to determine the cleaning member to be abnormal when the cleaning time is greater than the reference cleaning time, and wherein the cleaning time of the cleaning member is an amount of time that the cleaning member moves from the beginning spot to reach the ending spot, that the cleaning member moves from the beginning spot to the ending spot and returns to the beginning spot from the ending spot, or that the cleaning member returns from the ending spot to the beginning spot.

7. The cleaner of claim 2, wherein the controller is further configured to determine the cleaning member to be abnormal:

when information that the cleaning member reaches the ending spot is not transmitted in a first reference time after detecting the cleaning member starts moving from the beginning spot through the driving information of the cleaning member, or when information that the cleaning member returns to the beginning spot is not transmitted in a second reference time after receiving information that the cleaning member starts moving from the beginning spot and reaches the ending spot.

8. The cleaner of claim 1, further comprising a driving rail detachably disposed at one end of the ionizer, wherein the driving rail includes a first rail and a second rail configured to move the cleaning member such that a cleaning brush of the cleaning member is in contact with the wire when the cleaning member is operating.

9. The cleaner of claim 8, wherein the driver comprises:

a driving motor configured to drive the cleaning member;

fourth and fifth detection sensors positioned at the beginning spot of the wire and adjacent to the first and second rails, respectively, to detect that the cleaning member starts moving from or returns to the beginning spot;

sixth and seventh detection sensors positioned at the ending spot of the wire and adjacent to the first and second rail, respectively, to detect that the cleaning member reaches the ending spot; and a driving processor configured to drive and stop the driving motor under control of the controller and to transmit to the controller driving information, which includes a cleaning time and a returning time obtained from detection information provided from the fourth to seventh detection sensors, and wherein each of the fourth to seventh detection sensors comprise a position sensor.

10. The cleaner of claim 9, wherein the cleaning cartridge further including:

a pedestal arranged under the first and second bodies, the pedestal having a collecting hole formed at a region between the first and second bodies;

a collecting container arranged under the pedestal to collect the foreign substance through the collecting hole;

a third detection sensor configured to detect a weight of the foreign substance collected in the collecting container;

a first guide having one surface configured to make contact with an upper portion of the pedestal and the other surface moving along the first rail when the cleaning member is operating; and a second guide having one surface configured to make contact with the upper portion of the pedestal and the other surface moving along the second rail when the cleaning member is operating.

11. The cleaner of claim 1, further comprising a cover frame having a receiving space configured to receive the ionizer, the communication interface, the cleaning member, the driver and the controller.

* * * * *